United States Patent
Kim et al.

(10) Patent No.: US 10,367,205 B2
(45) Date of Patent: Jul. 30, 2019

(54) SECONDARY BATTERY

(75) Inventors: Jun-Sik Kim, Yongin-si (KR); So-Ra Lee, Yongin-si (KR); Sung-Soo Kim, Yongin-si (KR); Soo-An Song, Yongin-si (KR); Jeong-Soon Shin, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 641 days.

(21) Appl. No.: 13/471,098

(22) Filed: May 14, 2012

(65) Prior Publication Data

US 2013/0011732 A1 Jan. 10, 2013

(30) Foreign Application Priority Data

Jul. 6, 2011 (KR) ........................ 10-2011-0066820

(51) Int. Cl.
| | | |
|---|---|---|
| *H01M 4/66* | (2006.01) | |
| *H01M 4/04* | (2006.01) | |
| *H01M 4/139* | (2010.01) | |
| *H01M 4/02* | (2006.01) | |

(52) U.S. Cl.
CPC ........... *H01M 4/663* (2013.01); *H01M 4/666* (2013.01); *H01M 4/667* (2013.01); *H01M 4/0414* (2013.01); *H01M 4/0419* (2013.01); *H01M 4/139* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 7,048,822 B2 | 5/2006 | Yamashita et al. | |
| 8,617,751 B2 * | 12/2013 | Ito ....................... | H01M 4/8652 429/414 |
| 2004/0234850 A1 * | 11/2004 | Watarai et al. ............... | 429/217 |
| 2007/0000775 A1 * | 1/2007 | Nakahara et al. ....... | 204/297.01 |
| 2007/0092428 A1 * | 4/2007 | Sotowa et al. ........... | 423/445 R |
| 2008/0280208 A1 | 11/2008 | Naoi et al. | |
| 2009/0181309 A1 | 7/2009 | Kwon et al. | |

(Continued)

FOREIGN PATENT DOCUMENTS

| | | |
|---|---|---|
| CN | 1883068 A | 12/2006 |
| CN | 101488567 A | 7/2009 |

(Continued)

OTHER PUBLICATIONS

JP H11-073947—Electrode for battery & manufacture (English machine translation—AIPN).*

(Continued)

*Primary Examiner* — Miriam Stagg
*Assistant Examiner* — Claire L Roe
(74) *Attorney, Agent, or Firm* — Lewis Roca Rothgerber Christie LLP (57) ABSTRACT

A secondary battery includes a base material, an intermediate layer including a carbon material on the base material, and an active material layer on the intermediate layer. A secondary battery including an intermediate layer may improve adhesion between the base material and the active material layer, thereby reducing the risk of separation of the active material from the base material and improving the reliability and lifetime of the secondary battery.

8 Claims, 6 Drawing Sheets

(56) References Cited

U.S. PATENT DOCUMENTS

| | | | |
|---|---|---|---|
| 2009/0186276 A1 | 7/2009 | Zhamu et al. | |
| 2009/0226809 A1* | 9/2009 | Vu et al. | 429/220 |
| 2011/0111303 A1* | 5/2011 | Kung | H01B 1/18 |
| | | | 429/231.8 |
| 2012/0021294 A1* | 1/2012 | Zhamu | H01B 1/122 |
| | | | 429/231.8 |
| 2012/0321945 A1* | 12/2012 | Park | 429/211 |
| 2014/0242496 A1* | 8/2014 | Ryu | B32B 9/04 |
| | | | 429/517 |

FOREIGN PATENT DOCUMENTS

| | | | |
|---|---|---|---|
| EP | 2 081 244 A1 | 7/2009 | |
| JP | 10-144298 | 5/1998 | |
| JP | 11-031502 | 2/1999 | |
| JP | 11073947 A * | 3/1999 | H01M 4/02 |
| JP | 11312516 A * | 11/1999 | H01M 4/02 |
| JP | 2000-149924 | 5/2000 | |
| JP | 2002-134103 | 5/2002 | |
| JP | 2002-304997 | 10/2002 | |
| JP | 2002-352796 | 12/2002 | |
| JP | 2003-173781 | 6/2003 | |
| JP | 2004-030998 | 1/2004 | |
| JP | 2005-353377 | 12/2005 | |
| JP | 2008-282739 | 11/2008 | |
| JP | 2009-038020 | 2/2009 | |
| JP | 2009-170410 | 7/2009 | |
| JP | 2009-538495 | 11/2009 | |
| JP | 2010-108703 | 5/2010 | |
| JP | 2010-108971 | 5/2010 | |
| KR | 1998-059084 | 10/1996 | |
| KR | 1020130019375 B1 * | 2/2013 | H01M 4/96 |
| WO | WO 2008/115168 A2 | 9/2008 | |
| WO | WO 2010/025052 A1 | 3/2010 | |

OTHER PUBLICATIONS

JP H11-312516—Positive electrode for Li secondary battery & Li secondary battery using the same (English machine translation—J-PlatPat).*

Machine translation and Abstract in English of KR10-2013-0019375. (Year: 2018).*

European Search Report dated Nov. 27, 2012, for corresponding European Patent application 12175169.7, (6 pages).

Database WPI, Week 199832, Thompson Scientific, London, XP-002686717, corresponding to Japanese Publication 10-144298 listed above.

Database WPI, Week 200317, Thompson Scientific, London, XP-002686716, corresponding to Japanese Publication 2002-304997 listed above.

Database WPI, Week 201033, Thompson Scientific, London, XP-002686715, corresponding to Japanese Publication 2010-108971 listed above.

English translation of Japanese Office action dated Jul. 2, 2013, for corresponding Japanese Patent application 2011-212372, (previously submitted on Oct. 1, 2013), (4 pages).

English translation of KIPO Office action dated Dec. 18, 2012, for corresponding Korean Patent application 10-2011-0066820, (previously submitted on Feb. 28, 2013), (6 pages).

English translation of KIPO Notice of Allowance dated May 20, 2013, for corresponding Korean Patent application 10-2011-0066820, (previously submitted on Aug. 22, 2013), (2 pages).

SIPO Office action dated Sep. 2, 2015, for corresponding Chinese Patent application 201210233305.8, (7 pages).

SIPO Office action dated May 12, 2016 for corresponding Chinese Patent application 201210233305.8 (14 pages).

SIPO Office Action dated Jan. 5, 2017, with English translation, for corresponding Chinese Patent Application No. 201210233305.8 (10 pages).

* cited by examiner

$$L_C = \frac{0.9\,\lambda}{B\cos\theta_{002}}$$

SECONDARY BATTERY

CROSS-REFERENCE TO RELATED APPLICATION

This application claims priority to and the benefit of Korean Patent Application No. 10-2011-0066820, filed in the Korean Intellectual Property Office on Jul. 6, 2011, the entire content of which is incorporated herein by reference.

BACKGROUND

1. Field

This disclosure relates to an electrode, a secondary battery including the same, and a method of preparing the same.

2. Description of Related Art

In general, secondary batteries are rechargeable batteries, unlike primary batteries. Secondary batteries include an electrode assembly formed by stacking or winding a positive electrode plate, a negative electrode plate, and a separator interposed between the electrode plates. The positive electrode plate is generally formed by coating a positive electrode active material on a positive electrode base material and the negative electrode plate is generally formed by coating a negative electrode active material on a negative electrode base material.

During charging/discharging of the secondary battery, lithium ions are moved to the positive or negative electrode active material. However, if the positive or negative electrode active material is weakly adhered to the base material, the positive or negative electrode active material may be removed during the manufacturing process of the secondary battery. The removal of the active material may cause failure of a bare cell, and the failure of the bare cell may cause a serious problem, not only in the performance of the secondary battery, but also in the stability of the secondary battery.

SUMMARY

An aspect of an embodiment of the present invention is directed toward a secondary battery having an intermediate layer, including a carbon material, between a base material and an active material layer, thereby increasing the adhesive force between the base material and the active material layer. A secondary battery may also reduce the amount of binder required to be mixed in an active material slurry.

According to an aspect of the present invention, a secondary battery includes: abase material; an intermediate layer including a carbon material on the base material; and an active material layer on the intermediate layer.

The intermediate layer may further include a binder.

The carbon material may be selected from graphite, graphene nano-sheets, and graphene.

The adhesive force between the base material and the active material layer may be 0.5 to 5.0 gf/mm.

The thickness of the intermediate layer may be 0.2 to 5 μm.

The carbon material may include a crystalline region and an amorphous region.

The amorphous region of the carbon material may be 2 to 50% of the total carbon of the intermediate layer.

The base material may be a positive current collector.

The binder may include at least one of polyvinylidene fluoride (PVdF), polyimide (PI), polyamideimide (PAI), chitosan, and styrene-butadiene rubber (SBR).

A method of manufacturing a secondary battery includes preparing a base material, coating a mixture of carbon and a binder on the base material to form an intermediate layer, and forming an active material layer on the intermediate layer.

The mixture may be coated on the base material by screen printing or spray coating.

According to an aspect of an embodiment of the present invention, the separation of an active material from a base material is reduced or prevented by increasing the adhesive force between the base material and the active material, thereby improving the reliability and lifetime of the secondary battery. Further, because less binder is mixed in the active material slurry, the stability of the secondary battery may be improved.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive.

In addition, when an element is referred to as being "on" an element, it can be directly on the element or be indirectly on the element with one or more intervening elements interposed therebetween. Also, when an element is referred to as being "connected to" an element, it can be directly connected to the element or be indirectly connected to the element with one or more intervening elements interposed therebetween.

Hereinafter, like reference numerals refer to like elements. In the drawings, the thickness or size of layers may be exaggerated for clarity and thus, the drawings are not necessarily drawn to scale.

Figure 1:
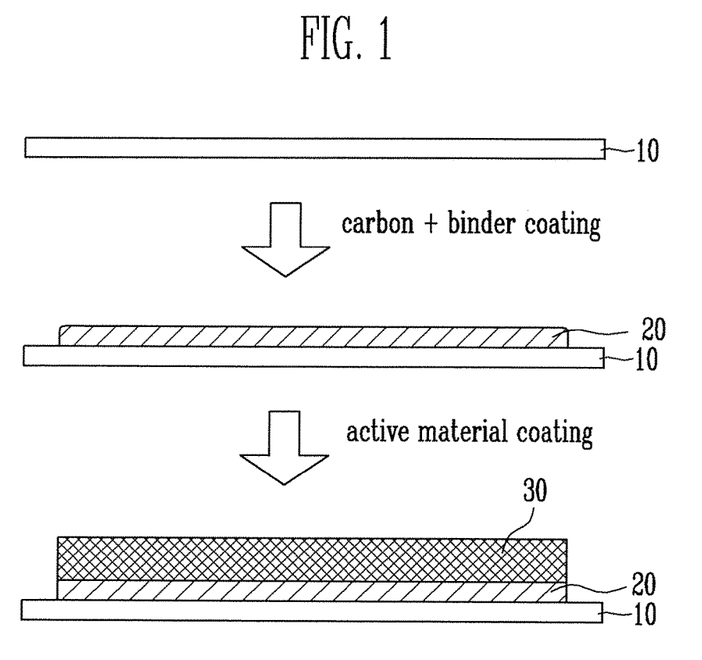
FIG. 1 is a sectional view illustrating a process of forming an intermediate layer and an active material layer on a base material in a secondary battery according to embodiments of the present invention.

FIG. 1 is a sectional view showing a process of forming an intermediate layer and an active material layer on a base material in a secondary battery according to an embodiment of the present invention.

Referring to FIG. 1, the secondary battery according to this embodiment includes a base material 10 and an active material layer 30 on the base material 10. The secondary battery further includes an intermediate layer 20, including a carbon material, interposed between the base material 10 and the active material layer 30. In embodiments of the present invention, a positive electrode for a secondary battery includes a base material 10, an intermediate layer 20 including a carbon material on the base material 10, and an active material layer 30 on the intermediate layer 20. In some embodiments of the present invention, the intermediate layer 20 may be directly on the base material 10 and the active material 30 may be directly on the intermediate layer 20.

First, the base material 10 is prepared. The base material 10 may be a positive or negative current collector (e.g., electrode collector) formed of a conductive metal thin plate. Particularly, the base material 10 may be a positive current collector. The positive current collector may be formed of, e.g., aluminum (Al).

The intermediate layer 20 including the carbon material is formed on the base material 10. In addition to the carbon, a binder having a strong adhesive force may also be included in the intermediate layer 20. That is, the intermediate layer 20 may have carbon and the binder mixed together, and the carbon and binder mixture may be thin-film coated on the base material 10 to form the intermediate layer 20. Since the binder is mixed in the intermediate layer 20, the adhesive force of the intermediate layer 20 with the base material 10 and/or the active material layer 20 may be improved (e.g., increased).

The carbon material of the intermediate layer 20 may have a crystalline region and an amorphous region, i.e., the intermediate layer 20 may include both crystalline carbon and amorphous carbon. A functional group of the binder may be bonded or adhered to the amorphous region. Accordingly, in the amorphous region of the carbon material, the bonding force of the amorphous region with a functional group of the binder may be improved compared to that of the crystalline region. For example, the functional group of the binder, which may be bonded to or adhered to the amorphous region, may include a hydroxyl group (R—OH), a carboxyl group (R—COOH), an aldehyde group (R—CHO), or the like. As such, the carbon material and the binder in the intermediate layer 20 may more easily constitute one layer.

The amorphous region of the carbon material may be 2 to 50% of the total carbon material of the intermediate layer 20. If the amorphous region is below 2% of the total carbon material of the intermediate layer 20, the carbon yield is relatively decreased when preparing the intermediate layer 20 and the price of the intermediate layer 20 is increased due to increased processing costs. In addition, the adhesive force of the intermediate layer 20 with the base material 10 and/or active material 30 is decreased. If the amorphous region is over 50% of the total carbon material of the intermediate layer 20, the resistance of the intermediate layer 20 is increased due to a decrease in conductivity.

The carbon material may be selected from graphite, graphene nano-sheets, and graphene.

If the carbon material is formed of the graphite, graphene nano-sheets, or graphene, the conductivity in the electrode plate may be improved and adhesive force between the base material 10 and/or the active material layer 30 may be increased. The electric conductivity of the graphite, graphene nano-sheets, or graphene is high. In addition, the contact area of the base material 10 with the active material layer 30 when carbon (e.g., the intermediate layer 20) is positioned between the base material 10 and the active material layer 30 is increased compared to that of the base material 10 with the active material layer 30 when the carbon material is not present. The increase in contact area results in an increase of the adhesive force in the electrode plate, and in addition, the electrical conductivity in the electrode plate is also increased.

If the carbon material is formed of graphene nano-sheets or graphene, the crystallinity of the carbon material is superior to graphite. Hence, these carbon materials may have further increased electrical conductivity.

The binder of the intermediate layer 20 may include at least one of polyvinylidene fluoride (PVdF), polyimide (PI), polyamideimide (PAI), chitosan, or styrene-butadiene rubber (SBR).

The thickness of the intermediate layer 20 (in which the carbon and the binder are mixed together) may be 0.2 to 5 μm. If the thickness of the intermediate layer 20 is less than 0.2 μm, the adhesive force of the intermediated layer 20 with the base material 10 and/or the active material layer 30 may be decreased. If the thickness of the intermediate layer 20 is greater than 5 μm, the adhesive force of the intermediated layer 20 with the base material 10 and/or the active material layer 30 may be increased, but the electrical conductivity of the intermediate layer 20 is undesirably decreased.

As described above, according to embodiments of the present invention, the active material layer 30 is formed on the intermediate layer 20, which is formed on the base material 10, thereby improving the adhesive force and the electrical conductivity of the electrode. The active material layer 30 may be formed by coating an active material slurry on the base material 10 (e.g., on the intermediate layer 20, which is on the base material 10) or by attaching an active material slurry formed in a sheet shape to the base material 10.

The active material layer 30 formed on the base material 10 (e.g., a positive current collector), may be formed using a positive electrode slurry (e.g., positive active material slurry). The positive electrode slurry includes a positive electrode active material, a conductive agent, and a small amount of positive electrode binder mixed in a solvent. The active material layer 30 may be formed by coating the positive electrode slurry on at least one surface of the positive current collector. For example, the active material layer 30 may be formed on an intermediate layer 20, which is on at least one surface the base material 10.

The positive electrode active material generates electrons by participating in a chemical reaction in the lithium secondary battery. The conducting agent may transfer the electrons generated in the positive electrode active material to the positive current collector. The positive electrode binder binds the positive electrode active material and the conducting agent to each other so as to maintain the mechanical strength of the positive electrode plate.

The positive electrode active material may include a lithium complex metal compound selected from $LiCoO_2$, $LiMn_2O_4$, $LiNiO_2$, $LiNi_{1-x}Co_xO_2$ (0<x>1), and $LiMnO_2$. However any suitable positive electrode active materials may be used.

Generally, carbon may be used as a negative electrode active material. However, in the present invention, carbon (e.g. carbon in the intermediate layer) may also be used as an adhesive between the active material layer 30 and the base material 10 (i.e., positive current collector). As described above, the intermediate layer 20 is formed so that two layers, i.e., the intermediate layer 20 and the active material layer 30, are formed on the base material. Accordingly, the adhesion and electrical conductivity of the base material 10 and the active material layer 30 may be improved.

Further, the intermediate layer 20 including the carbon is formed on the base material 10, so that the resistance of the base material 10 may be decreased, thereby improving the high power and long-lifetime characteristics of the secondary battery. Furthermore, the base material 10 (on which the intermediate layer 20 including the carbon is formed) has significantly improved adhesion with the active material layer 30 while maintaining characteristics of general base materials.

Hereinafter, a charging/discharging process of a secondary battery will be briefly described. When the secondary battery is charged by providing electrons to a negative electrode of the secondary battery from a charger, lithium ions move from the positive electrode active material to the negative electrode active material. That is, lithium ions generated from a lithium compound in the positive electrode migrate through an electrolyte and are then intercalated into the negative electrode active material, thereby charging the secondary battery. When the secondary battery is discharged, the lithium ions intercalated into the negative electrode active material deintercalate and move to the positive electrode material. That is, the lithium ions migrate through the electrolyte and the separator from the negative electrode active material and are then intercalated into the lithium compound, thereby discharging the secondary battery.

As described above, the positive and negative electrode active materials of the secondary battery enable the charging/discharging of the secondary battery to be performed by moving lithium ions. Therefore, the adhesive force of these active materials should be high so that these active materials are not separated from the base material 10. In the present invention, the intermediate layer 20 containing carbon is formed between the base material 10 and the active material layer 30, so that it the adhesive force between the base material 10 and the active material layer 30 is improved.

Binder may also be included in the intermediate layer 20, thereby reducing the amount of binder used in the active material slurry, or reducing performance deterioration of the secondary battery (i.e., because less binder is used in the active material slurry, more active material is present). Although the amount of the binder in the active material slurry is decreased, the binder included in the intermediate layer 20 can reinforce the adhesive force between the base material 10 and the active material layer 30, and the adhesive force is greater than when the entire amount of binder is included in the active material slurry.

Hereinafter, a manufacturing method of a secondary battery according to embodiments of the present invention will be described.

First, a base material 10 is prepared. An intermediate layer 20 is formed by coating a carbon solution and a binder solution on the base material 10. In embodiments of the present invention, the carbon and binder may be mixed together prior to coating them onto the base material. The carbon solution may be any one selected from graphite, graphene nano-sheets, and graphene.

The mixed solution of carbon and the binder may be coated on the base material 10 using a screen print coating method or spray coating method. When using the screen print coating method, a mask has an opened region in which the mixed solution of the carbon and the binder is to be coated. The mask is positioned on the base material 10. Then, the mixed solution of the carbon and the binder is transferred on the base material 10 through the opened region of the mask, using a roller. When using the spray coating method, a mask has an opened region in which the mixed solution of the carbon and the binder is to be coated. The mask is positioned on the base material 10. Then, the mixed solution of the carbon and the binder is sprayed onto the mask. Accordingly, the mixed solution of the carbon and the binder can be coated on the base material 10.

Then, an active material layer 30 is formed on the intermediate layer 20.

Figure 2:
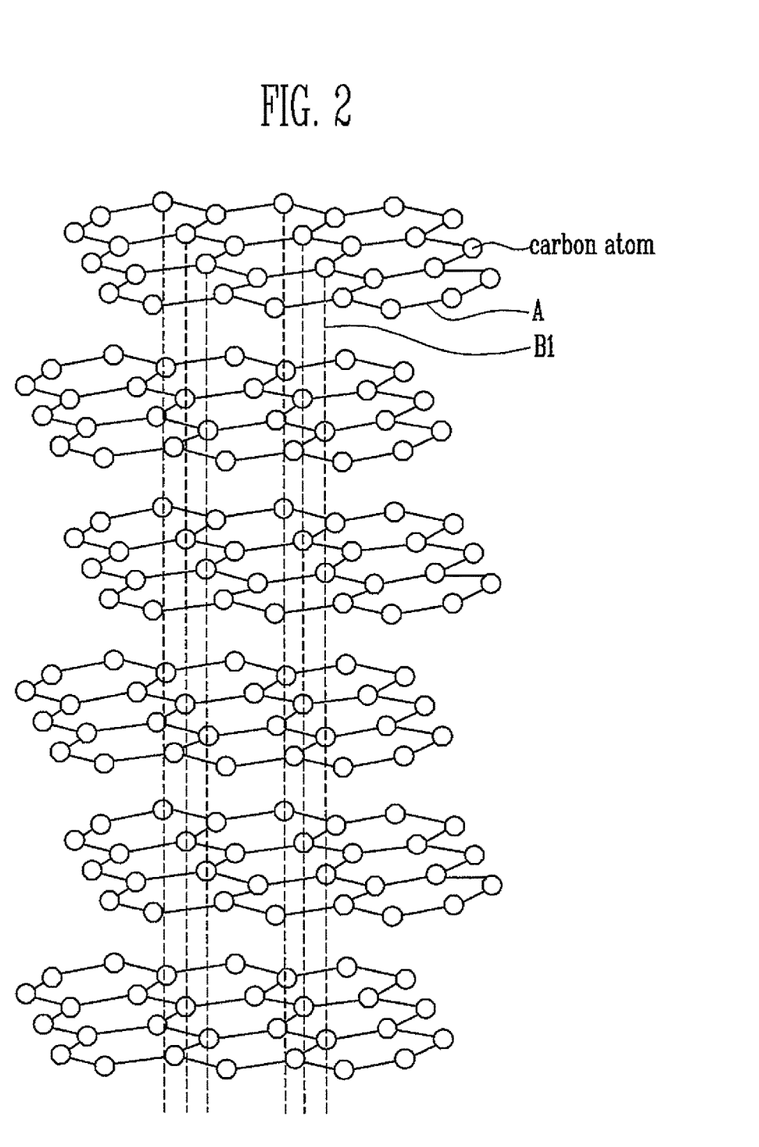
FIG. 2 is a chemical structural formula of graphite.

FIG. 2 is a chemical structural formula of graphite. Referring to FIG. 2, graphite has a hexagonal system crystal, in which a plurality of plate-shaped structures are overlapped with one another. That is, in the structure of graphite, rings each composed of six carbon atoms are connected to constitute layers. Covalent bonding is present between carbon atoms (A) in the same layer, and a weak bonding force is present between carbon atoms (B1) in different layers.

Figure 3A:
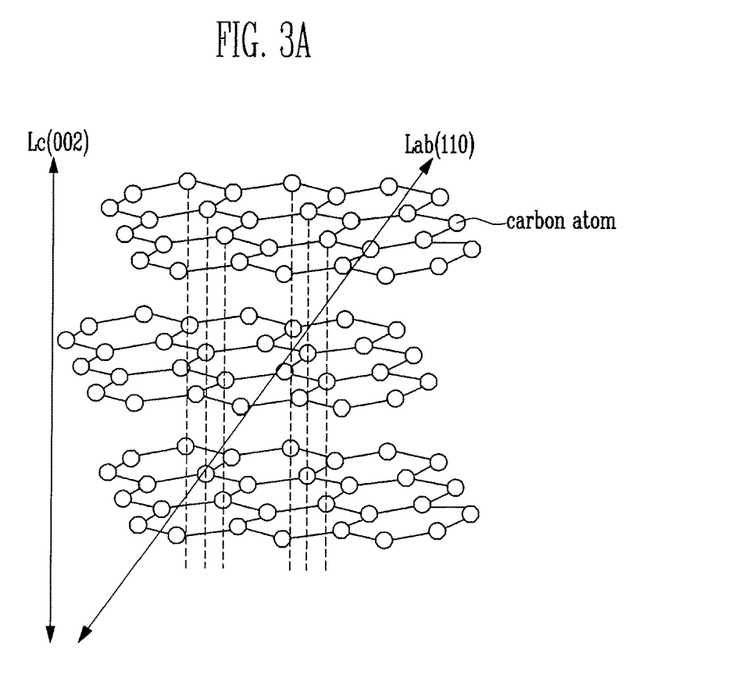
FIG. 3A is a chemical structural formula of graphene nano-sheets.

FIG. 3A is a chemical structural formula of a graphene nano-sheet. Referring to FIG. 3A, a graphene nano-sheet is formed by forming a single plate-shaped structure of the graphite of FIG. 2, having a thickness of 5 to 50 nm. That is, a graphene nano-sheet is formed by breaking the bonding between the carbon atoms (B1) in different layers. Since the thickness of a graphene nano-sheet is smaller than that of graphite, the electric conductivity in the electrode plate is improved and the adhesive force of the electrode plate, even using a smaller amount of a graphene nano-sheet, is improved.

Figure 3B:
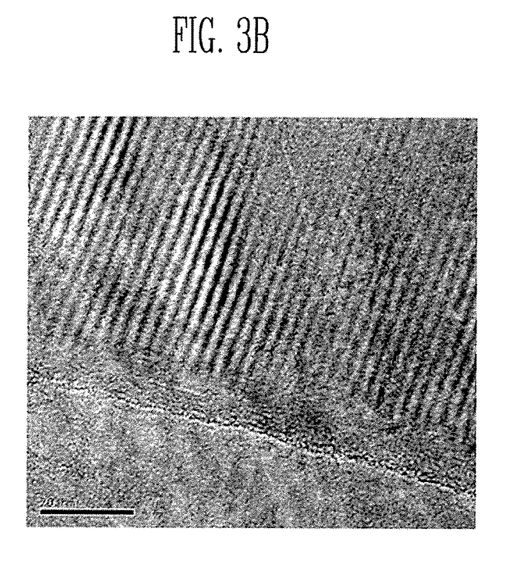
FIG. 3B is a transmission electron microscope (TEM) photograph of graphene nano-sheets.

FIG. 3B is a transmission electron microscope (TEM) photograph of graphene nano-sheets. As shown in FIG. 3B, graphene nano-sheets used in the present invention have a crystalline region and an amorphous region mixed together. The upper side of FIG. 3B is a crystalline region, and the lower side of FIG. 3 is an amorphous region. Since the crystalline region and the amorphous region are mixed as described above, using a graphene nano-sheet is cheaper than using a carbon material constituting a perfect crystal.

Since the surface of the amorphous region is rougher than that of the crystalline region, the surface area of the amorphous region is large. Thus, when graphene nano-sheets are used in the intermediate layer 20 (see FIG. 1), adhesive force of the intermediate layer 20 including graphene nano-sheets with the base material 10 (see FIG. 1) or the active material layer 30 (see FIG. 1) is high. As described above, the adhesion of the amorphous region to the functional group in the binder is greater than the adhesion of the crystalline region to the functional group in the binder.

Figure 4:
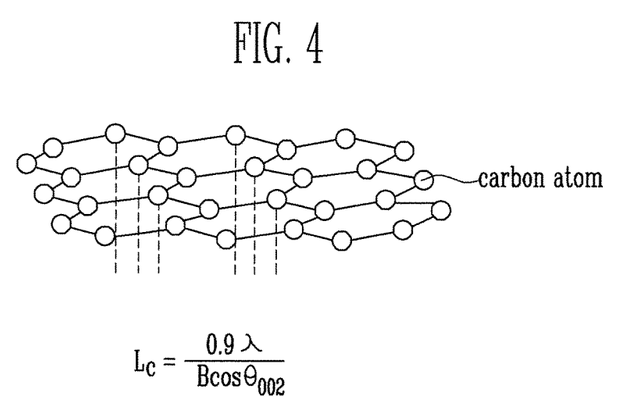
FIG. 4 is a chemical structural formula of graphene.

FIG. 4 is a chemical structural formula of graphene. Referring to FIG. 4, the term 'graphene' is a coined word made by combining 'graphite' that mean carbon and '~ene' that means 'unsaturated hydrocarbon'. That is, graphene is a carbon compound that means a layer of graphite. Graphene has a two-dimensional shape.

Particularly, if the intermediate layer 20 including graphene nano-sheets or graphene is coated on the base material 10, the Van der Waals attraction between the intermediate layer 20 and the base material 10 may be increased. If the active material layer 30 is coated on the intermediate layer 20 in a subsequent process, the Van der Waals attraction between the active material layer 30 and the intermediate layer 20 may be increased, so that the adhesive force between the active material layer 30 and the intermediate layer 20 is increased.

Since graphene nano-sheets and graphene are planar sheet-shaped, their contact surface may be large. Graphene can form a plane triangular structure that is an $sp^2$ structure of three sp-orbitals composed of one s-orbital and two p-orbitals.

In Table 1, below, adhesive forces in an Example according to an embodiment of the present invention and a Comparative Example are compared with each other. In the Example, an intermediate layer 20 is formed between the base material 10 and the active material layer 30, and in the Comparative Example, the intermediate layer 20 is not formed between the base material 10 and the active material layer 30.

TABLE 1

| Section | Presence of intermediate layer | Adhesive force (gf/mm) |
|---|---|---|
| Example | ○ | 1.4 |
| Comparative Example | X | 0.4 |

As shown in Table 1, the adhesive force between the base material 10 and the active material layer 30 in the Example is greater than that between the base material 10 and the active material layer in the Comparative Example. That is, the adhesive force when the intermediated layer 20 is formed between the base material 10 and the active material layer 30 is 1.4 gf/mm, and the adhesive force when the intermediate layer 20 is not formed between the base material 10 and the active material layer 30 is 0.4 gf/mm.

The adhesive force between the base material 10 and the active material layer 30 when the intermediate layer 20 is formed between the base material 10 and the active material layer 30 may be 0.5 to 5.0 gf/mm. When the adhesive force between the base material 10 and the active material layer 30 is less than 0.5 gf/mm, foreign matter is produced due to the separation of the electrode plate when winding the electrode plate, and therefore, the safety of the cell may be reduced. When the adhesive force between the base material 10 and the active material layer 30 is greater than 5.0 gf/mm, the electrode plate becomes hard, and therefore, the electrode plate may be broken when winding the electrode plate.

Figure 5:
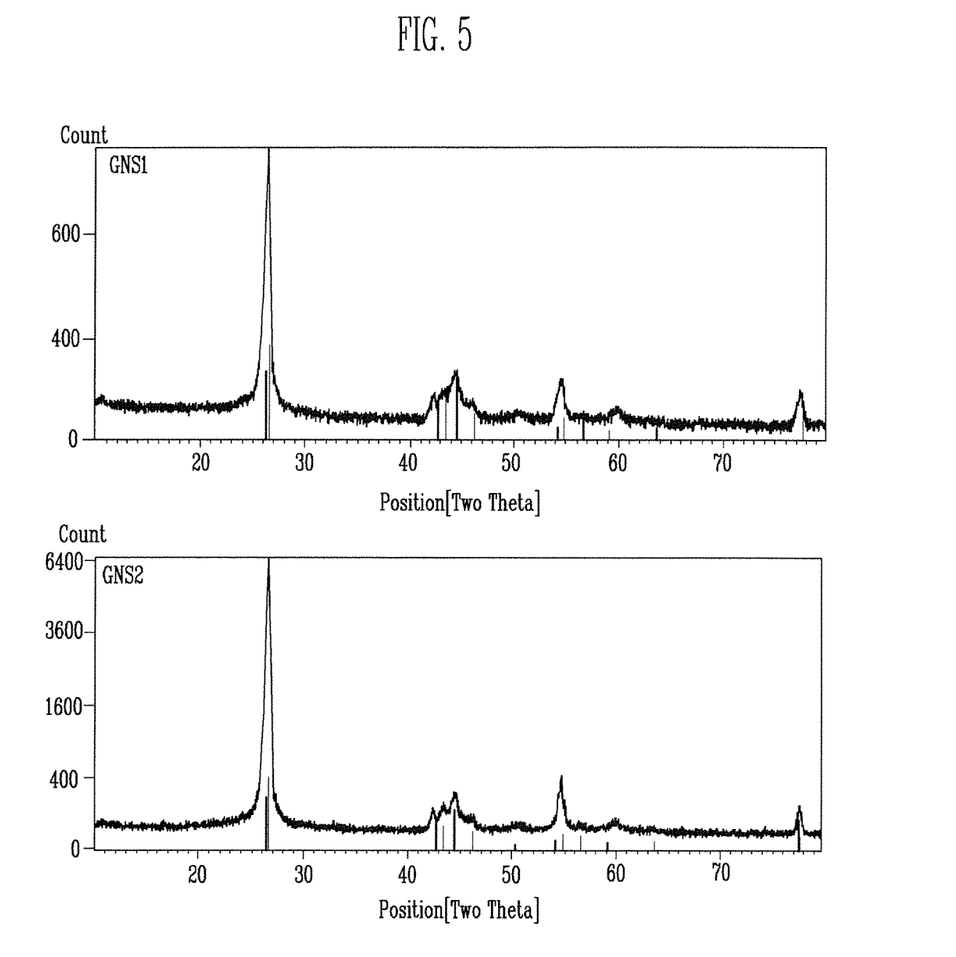
FIG. 5 is a graph showing an X-ray diffraction (XRD) analysis result of the graphene nano-sheet of FIG. 3.

FIG. 5 is a graph showing an X-ray diffraction (XRD) analysis result of the graphene nano-sheet f FIG. 3A. Referring to FIG. 5, in the XRD analysis, the diffraction pattern of the sample was analyzed by scattering or diffraction by projecting an X-ray onto the sample. Thus, the microstructure of the carbon material, particularly the crystallinity of the carbon material, can be more precisely obtained using the XRD analysis. Particularly, the crystal size Lc of the graphene nano-sheet of FIG. 3A can be evaluated according to Scherer's Equation represented by Expression 1.

$$L_C = \frac{0.9\lambda}{B\cos\theta_{002}} \qquad \text{Expression 1}$$

Lc denotes a crystalline size, B denotes a peak width (FWHM, Full Width at Half Maximum), λ denotes a wavelength of the x-rays, and θ denotes an angle corresponding to the peak.

TABLE 2

| Section | FWHM | $\theta_{002}$ | Crystal size (Å) |
|---|---|---|---|
| Embodiment 1 (GNS Lc) | 0.56029 | 26.384 | 146 |
| Embodiment 2 (GNS Lc) | 0.46844 | 26.577 | 174 |

The crystal size, Lc, of the graphene nano-sheet can be determined by substituting the values of Table 2 in Expression 1. The crystal sizes in embodiments 1 and 2 are 146 Å and 174 Å, respectively.

Figure 6:
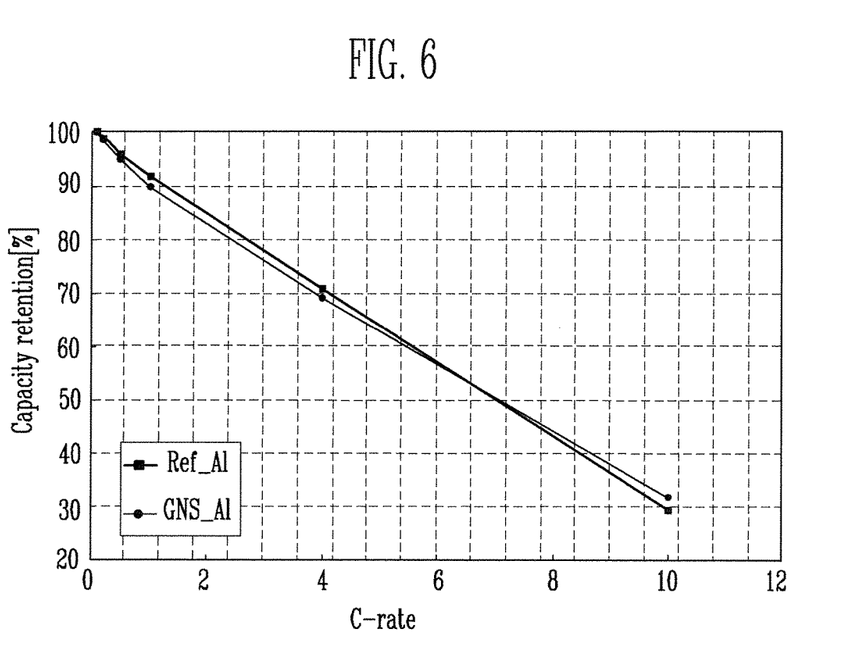
FIG. 6 is a graph comparing the capacity retention at different C-rates of an embodiment of the present invention having graphene nano-sheets in the intermediate layer and an electrode that does not include a carbon intermediate layer.

FIG. 6 is a graph obtained by comparing the capacity retention at various C-rates of a traditional base material and an electrode plate having graphene nano-sheets formed on the base material. That is, referring to FIG. 6, capacity retention of an electrode plate obtained by forming an active material layer on a base material and an electrode plate obtained by forming a graphene nano-sheet and an active material layer on a base material was measured at various charging/discharging rates (C-rates).

The charging/discharging rate (C-rate) is a unit for setting current values under various use conditions in the charging/discharging of a secondary battery and estimating or representing the available use time of the secondary battery. The current value according to the charging/discharging rate is evaluated by dividing charging or discharging current by a rated capacity of the secondary battery.

Charging/discharging rate (A)=charging/discharging current (A)/rated capacity of secondary battery Under conditions of current evaluated from the charging/discharging rate, the use time can be converted or estimated by the following expression based on the capacity presented in proportion to the rated capacity.

Use time (h)=presented capacity (Ah)/discharging current (A)

Remaining capacity rate (%)=remaining capacity [mAh/g] of active material/initial capacity [mAh/g] of active material When comparing an electrode plate (GNS_Al) obtained by coating graphene nano-sheets on an aluminum base material according to an embodiment of the present invention with an electrode plate (Ref_Al) using the aluminum base material, their capacity retention at various C-rates are almost identical or similar to each other. That is, the electrode plate obtained by coating graphene nano-sheets on the base material according to an embodiment of the present invention can have improved adhesion. Further, the electrode plate according to an embodiment of the present invention can show almost identical capacity retention at various C-rates compared to that of the electrode plate using the existing aluminum base material, while maintaining low resistance.

Figure 7:
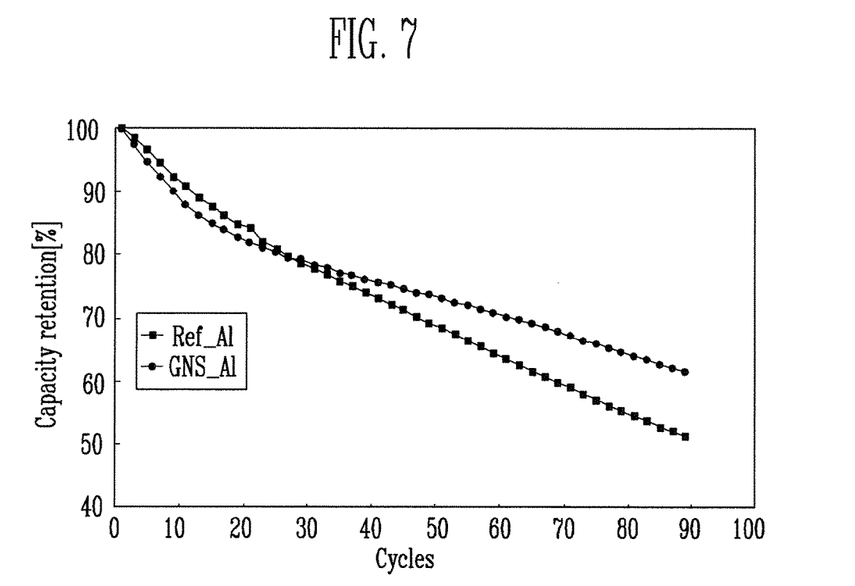
FIG. 7 is a graph comparing the capacity retention over the cycle life of an embodiment of the present invention having graphene nano-sheets in the intermediate layer and an electrode that does not include a carbon intermediate layer.

FIG. 7 is a graph obtained by comparing the capacity retention over the cycle life of the base material and the electrode plate having graphene nano-sheets formed on the base material at a high C-rate. As shown in FIG. 7, the capacity retention over the cycle life of the samples were obtaining by repeatedly charge and discharging of the battery at a 4C-rate. When comparing an electrode plate (GNS_Al) obtained by coating graphene nano-sheets on an aluminum base material according to an embodiment of the present invention with an electrode plate (Ref_Al) using the aluminum base material, their high-rate lifetime characteristics are similar to each other. That is, as the samples were repeatedly charged/discharged, the capacity retention decreased similarly.

However, when comparing capacity retention after 90 charging/discharging cycles, the capacity retention of an embodiment of the present invention (GNS_Al) is about 61%, and the capacity retention of the comparative material (Ref_Al) is about 52%. Accordingly, it can be seen that the electrode plate (GNS_Al) according to an embodiment of the present invention shows a high-rate lifetime characteristic superior to the comparative material (Ref_Al).

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A secondary battery comprising:
a base material;
an intermediate layer on the base material, the intermediate layer consisting of a carbon material and a binder; and
an active material layer on the intermediate layer,
wherein
the binder is mixed with the carbon material,
the binder comprises at least one material selected from the group consisting of polyimide (PI), polyamideimide (PAI), chitosan, and styrene-butadiene rubber (SBR),
the carbon material is graphene nano-sheets having a thickness of 5 to 50 nm,
an adhesive force between the base material and the active material layer is 0.5 to 5.0 gf/mm, and
each of the graphene nano-sheets contains: an amorphous region and a crystalline region, the amorphous region being mixed with the crystalline region in a crystallographic basal plane,
wherein the base material comprises a positive current collector, and
the active material layer comprises a lithium complex metal compound selected from $LiCoO_2$, $LiMn_2O_4$, $LiNiO_2$, $LiNi_{1-x}Co_xO_2$(0<x>1), and $LiMnO_2$.

2. The secondary battery of claim 1, wherein a thickness of the intermediate layer is 0.2 to 5 µm.

3. The secondary battery of claim 1, wherein the amorphous region of the carbon material is 2 to 50% of the total carbon.

4. A method of manufacturing a secondary battery, the method comprising:
preparing a base material;
coating a carbon material and a binder on the base material to form an intermediate layer, the intermediate layer consisting of the carbon material and the binder; and
and
forming an active material layer on the intermediate layer,
wherein the binder comprises at least one material selected from the group consisting of polyimide (PI), polyamideimide (PAI), chitosan, and styrene-butadiene rubber (SBR),
wherein the carbon material and the binder are mixed together prior to coating,
the carbon material is graphene nano-sheets having a thickness of 5 to 50 nm,
wherein an adhesive force between the base material and the active material layer is 0.5 to 5.0 gf/mm, and
each of the graphene nano-sheets contains: an amorphous region and a crystalline region, the amorphous region being mixed with the crystalline region in a crystallographic basal plane,
wherein the base material comprises a positive current collector, and
the active material layer comprises a lithium complex metal compound selected from $LiCoO_2$, $LiMn_2O_4$, $LiNiO_2$, $LiNi_{1-x}Co_xO_2$(0<x>1), and $LiMnO_2$.

5. The method of claim 4, wherein the coating comprises coating the mixture using screen printing.

6. The method of claim 4, wherein the coating comprises coating the mixture using spray coating.

7. The secondary battery of claim 1, wherein a bonding force between the amorphous region of the carbon material and a functional group of the binder is stronger than a bonding force between the crystalline region of the carbon material and the functional group of the binder.

8. The method of claim 4, wherein a bonding force between the amorphous region of the carbon material and a functional group of the binder is stronger than a bonding force between the crystalline region of the carbon material and the functional group of the binder.

* * * * *